United States Patent
Matsumoto et al.

(10) Patent No.: US 9,705,140 B2
(45) Date of Patent: Jul. 11, 2017

(54) VEHICLE FUEL CELL APPARATUS WITH IMPROVED AIR INTAKE

(71) Applicant: SUZUKI MOTOR CORPORATION, Shizuoka (JP)

(72) Inventors: Shiro Matsumoto, Shizuoka (JP); Kengo Ikeya, Shizuoka (JP); Damian Patrick Davies, Nottinghamshire (GB); Nathan Grange, Derbyshire (GB)

(73) Assignee: SUZUKI MOTOR CORPORATION, Shizuoka (JP)

( * ) Notice: Subject to any disclaimer, the term of this patent is extended or adjusted under 35 U.S.C. 154(b) by 240 days.

(21) Appl. No.: 14/396,696

(22) PCT Filed: Apr. 23, 2013

(86) PCT No.: PCT/JP2013/061899
§ 371 (c)(1),
(2) Date: Oct. 23, 2014

(87) PCT Pub. No.: WO2013/161804
PCT Pub. Date: Oct. 31, 2013

(65) Prior Publication Data
US 2015/0147671 A1    May 28, 2015

(30) Foreign Application Priority Data
Apr. 27, 2012  (JP) .................. 2012-103114

(51) Int. Cl.
*H01M 8/04* (2016.01)
*H01M 8/04014* (2016.01)
(Continued)

(52) U.S. Cl.
CPC ..... *H01M 8/04014* (2013.01); *B60L 11/1883* (2013.01); *B60L 11/1894* (2013.01);
(Continued)

(58) Field of Classification Search
None
See application file for complete search history.

(56) References Cited

U.S. PATENT DOCUMENTS

| 2001/0053469 A1 | 12/2001 | Kobayashi et al. |
| 2005/0260466 A1 | 11/2005 | Kobayashi et al. |
| 2008/0241619 A1* | 10/2008 | Tomimatsu ....... H01M 8/04194 429/447 |

FOREIGN PATENT DOCUMENTS

| GB | 2495053 A | 3/2013 |
| JP | 2000-195533 A | 7/2000 |

(Continued)

OTHER PUBLICATIONS

International Search Report mailed Jul. 30, 2013 in PCT/JP2013/061899.
(Continued)

*Primary Examiner* — Ula C Ruddock
*Assistant Examiner* — Tony Chuo
(74) *Attorney, Agent, or Firm* — Rothwell, Figg, Ernst & Manbeck, P.C.

(57) ABSTRACT

A vehicle fuel cell apparatus includes a fuel cell stack configured to take in air as a reaction gas and a coolant through an air intake aperture area, and discharge temperature-raised air through air discharging aperture areas. An air suction duct, air discharge ducts, and air discharge fans take in air to the air suction duct. The air discharge ducts have air discharge ports in the vicinity of the air suction duct. The air suction duct is formed with first air intake ports opening at its upstream end portion, and second air intake ports opening at locations nearer to the air discharge ports of the air discharge ducts than the first air intake ports. The second air intake ports are provided with shutters. The arrangement provides a vehicle fuel cell apparatus having enhanced
(Continued)

operability in situations involving low-temperature outside air, and allows for enhanced mountability to vehicles.

9 Claims, 8 Drawing Sheets

(51) Int. Cl.
| | |
|---|---|
| B60L 11/18 | (2006.01) |
| H01M 8/2485 | (2016.01) |
| H01M 8/249 | (2016.01) |
| H01M 8/04089 | (2016.01) |
| H01M 8/04082 | (2016.01) |
| H01M 8/04007 | (2016.01) |
| H01M 8/04223 | (2016.01) |
| H01M 8/0432 | (2016.01) |
| H01M 8/04746 | (2016.01) |
| B60K 11/06 | (2006.01) |
| H01M 8/247 | (2016.01) |
| B60K 1/04 | (2006.01) |

(52) U.S. Cl.
CPC ....... *B60L 11/1898* (2013.01); *H01M 8/0432* (2013.01); *H01M 8/04074* (2013.01); *H01M 8/04089* (2013.01); *H01M 8/04201* (2013.01); *H01M 8/04268* (2013.01); *H01M 8/04753* (2013.01); *H01M 8/04768* (2013.01); *H01M 8/249* (2013.01); *H01M 8/2485* (2013.01); *B60K 11/06* (2013.01); *B60K 2001/0411* (2013.01); *B60L 2240/36* (2013.01); *B60L 2240/662* (2013.01); *H01M 8/247* (2013.01); *H01M 2250/20* (2013.01); *Y02T 10/7291* (2013.01); *Y02T 90/16* (2013.01); *Y02T 90/32* (2013.01); *Y02T 90/34* (2013.01)

(56) References Cited

FOREIGN PATENT DOCUMENTS

| | | | |
|---|---|---|---|
| JP | 2002-56871 A | 2/2002 | |
| JP | 2006-93025 A | 4/2006 | |
| JP | 2006-140050 A | 6/2006 | |
| JP | 2007-191060 A | 8/2007 | |
| JP | 2008-037329 | * 2/2008 | ............ B60K 11/08 |
| JP | 2008-37329 A | 2/2008 | |
| JP | 2008-210628 A | 9/2008 | |
| JP | 2009-140872 A | 6/2009 | |
| JP | 2010-27217 A | 2/2010 | |
| JP | 2010-234992 A | 10/2010 | |
| JP | 2012-025294 | * 2/2012 | ............ B60K 11/04 |
| JP | 2012-54033 A | 3/2012 | |

OTHER PUBLICATIONS

Office Action issued in corresponding Chinese patent application 201380021067.7 dated Aug. 19, 2016, 4 pages.
Notice of Allowance issued in corresponding Japanese patent application 2014-512604 dated Mar. 8, 2016, 1 page.

* cited by examiner

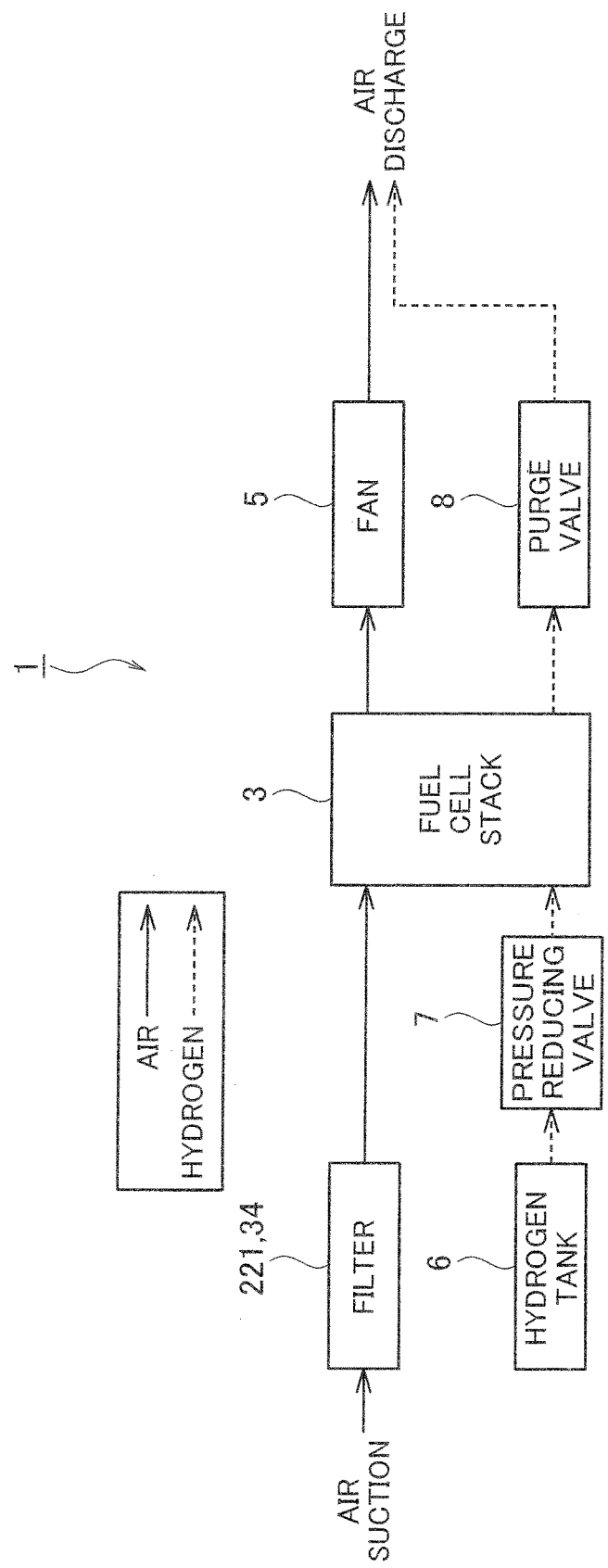

VEHICLE FUEL CELL APPARATUS WITH IMPROVED AIR INTAKE

CROSS REFERENCE TO RELATED APPLICATION

This application is a 35 U.S.C. 371 National Phase Entry Application from PCT/JP2013/061899, filed Apr. 23, 2013, which claims priority to Japanese Patent Application No. 2012-103114, filed Apr. 27, 2012, the disclosures of which are incorporated herein in their entirety by reference.

TECHNICAL FIELD

The present invention relates to a fuel cell apparatus for vehicles, and particularly, to a fuel cell apparatus for vehicles using air as a reaction gas and a coolant.

BACKGROUND ART

As an issue on fuel cell vehicles, there is the problem of undergoing a reduced startability at low temperatures. In cases of fuel cell vehicles parked outdoor in the night, or under low-temperature environments such as those in cold weather districts, fuel cells may have reduced power-generating performances, involving such cases as failing to feed necessary power when starting or running. In this regard, as a countermeasure, there has been proposed a method of warming a fuel cell stack, using a heater or an exhaust fan (for instance, refer to the patent literature 1 below). This method involves issues including increased power consumed by the heater, or increased numbers of parts such as those due to addition of the exhaust fan to be dedicated for the warming. Moreover, there has been proposed a method of using discharge gases of fuel cells for heating pieces of equipment to be warmed (for instance, refer to the patent literature 2 below). Besides them, there have been proposed warming methods using heat storage materials or catalyst combustion, or the like. However, all the proposals have been accompanied by problems such as complexity of the system being a fuel cell apparatus, and an increased number of components being the parts.

TECHNICAL LITERATURES

Patent Literatures

Patent Literature 1:
Japanese Patent Application Laying Open Publication No. 2010-234992
Patent Literature 2:
Japanese Patent Application Laying Open Publication No. 2009-140872

SUMMARY OF INVENTION

Problem to be Solved by the Invention

For this reason, the present invention has been devised in view of problems described, and it is an object thereof to provide a fuel cell apparatus for vehicles adapted for a fuel cell stack to have enhanced operability in situations involving low-temperature outside air, allowing for enhanced mountability to vehicles.

Solution to the Problem

According to aspects of the present invention, there is a fuel cell apparatus for vehicles including a fuel cell stack disposed in a space enclosed by vehicle body panels, and configured to take in air as a reaction gas and a coolant through an air intake aperture area to an inside thereof, and discharge temperature-raised air through an air discharging aperture area to an outside thereof, an air suction duct connected to the air intake aperture area, an air discharge duct connected to the air discharging aperture area, and a fan configured to take in air to the air suction duct, characterized by the air discharge duct having an air discharge port thereof disposed in a vicinity of the air suction duct, the air suction duct being formed with a first air intake port set opening at an upstream end portion of the air suction duct, and a second air intake port set opening at a location set nearer to the air discharge port than the first air intake port set, and a shutter set provided at the second air intake port set to open or close the second air intake port set.

An aspect described is characterized in that the shutter set is set up to open when outside air has temperatures lower than a lower limit temperature of a range of temperatures affording for the fuel cell stack to operate as necessary.

An aspect described is characterized in that the fuel cell stack is mounted on a vehicle, with the air intake aperture area in a vehicle-longitudinally frontward oriented position, and the second air intake port set is substantially vehicle-longitudinally rearward open.

An aspect described is characterized in that the second air intake port set is arranged on both vehicle-transverse sides of the air suction duct.

An aspect described is characterized in that the first air intake port set is provided with a shutter set to open or close the first air intake port set.

Effects of the Invention

According to the present invention, it is possible to implement a fuel cell apparatus for vehicles adapted for a fuel cell stack to have enhanced operability in situations involving low-temperature outside air, allowing for enhanced mountability to vehicles.

BRIEF DESCRIPTION OF DRAWINGS

FIG. 8 is a block diagram of the fuel cell apparatus for vehicles according to the embodiment of the present invention.

EMBODIMENTS FOR CARRYING OUT THE INVENTION

There will be described details of a fuel cell apparatus for vehicles according to an embodiment of the present invention, with reference to the drawings. This embodiment employs senses of longitudinal, transverse, and vertical directions of a vehicle defined by arrows in drawings, for the convenience in description.

Figure 1:
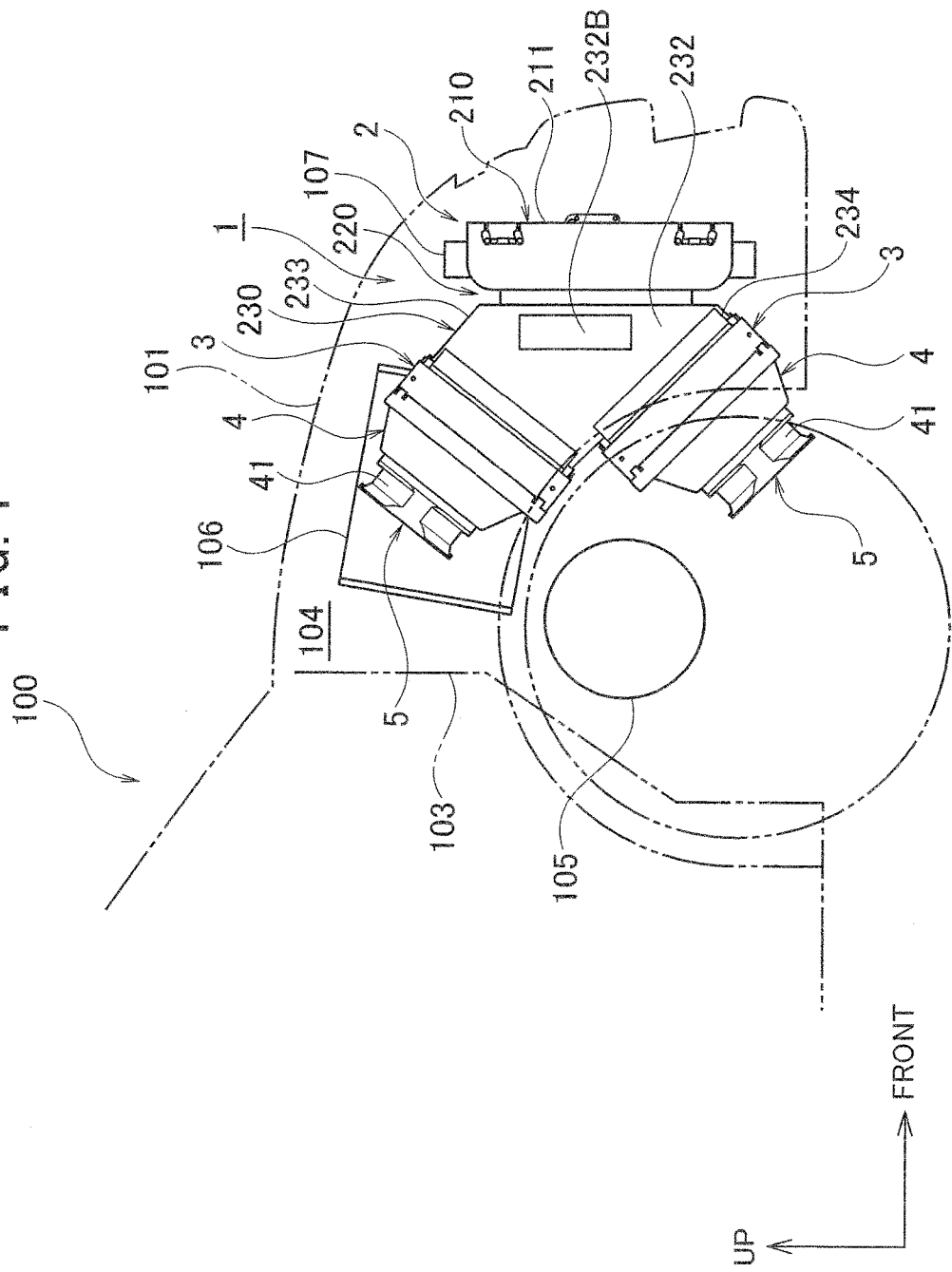
FIG. 1 is a side-explanatory diagram showing a front section of a vehicle having mounted thereon a fuel cell apparatus for vehicles according to an embodiment of the present invention.
Figure 2:
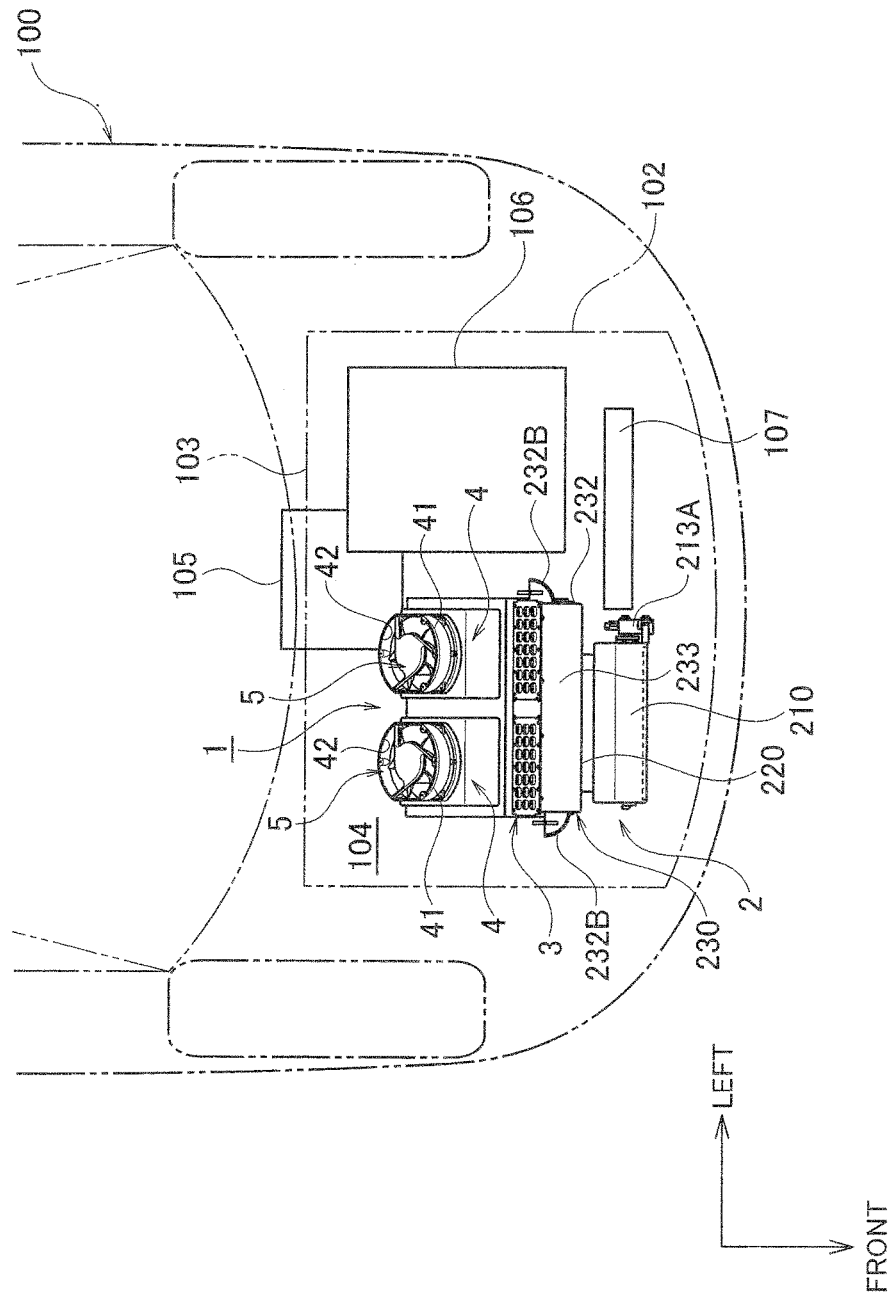
FIG. 2 is a plan-explanatory diagram showing the front section of the vehicle having mounted thereon the fuel cell apparatus for vehicles according to the embodiment of the present invention.

As shown in FIG. 1 and FIG. 2, at a front section of a vehicle 100, there is mounted a fuel cell apparatus 1 for vehicles. The fuel cell apparatus 1 for vehicles is disposed in an engine room 104 that is a space enclosed by vehicle body panels at the front section of the vehicle 100. As shown in FIG. 1 and FIG. 2, the vehicle body panels include an engine hood 101, side panels 102, and a dash panel 103. The engine room 104 is furnished with a drive motor 105, an inverter 106, and a radiator 107, besides the fuel cell apparatus 1 for vehicles. The fuel cell apparatus 1 for vehicles is substantially made up by an air suction duct 2, a pair of fuel cell stacks 3, two pairs of air discharge ducts 4 provided as one pair and one pair on the fuel cell stacks 3, respectively, and air discharge fans 5 provided on the air discharge ducts 4 in a one-to-one relationship.

(Air Suction Duct)

Figure 3:
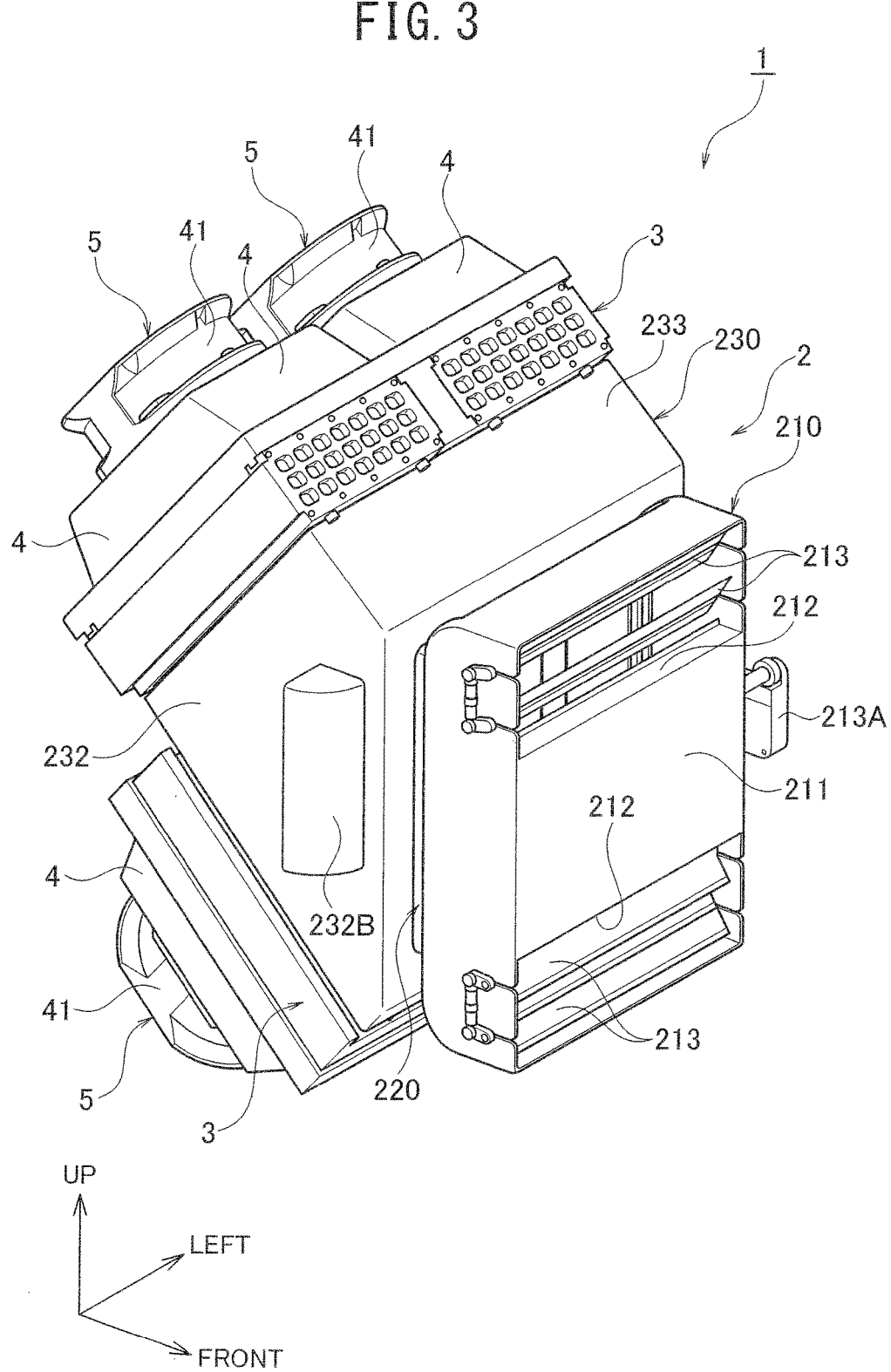
FIG. 3 is a perspective view showing the fuel cell apparatus for vehicles according to the embodiment of the present invention, as it is seen from diagonally ahead.

As shown in FIG. 3, the air suction duct 2 includes a first duct portion 210, a second duct portion 220, and a third duct portion 230. The first duct portion 210 has a box structure outlined substantially in a cuboid shape. At a vehicle-longitudinally front side of the first duct portion 210 there is a front panel 211 formed with a pair of first air intake ports 212. These first air intake ports 212 are formed at vertically spaced two locations on the front panel 211. The first air intake ports 212 have their shutters 213. The shutters 213 are adapted to be driven to rotate with a shutter driver 213A, to thereby open or close the first air intake ports 212.

Figure 4:
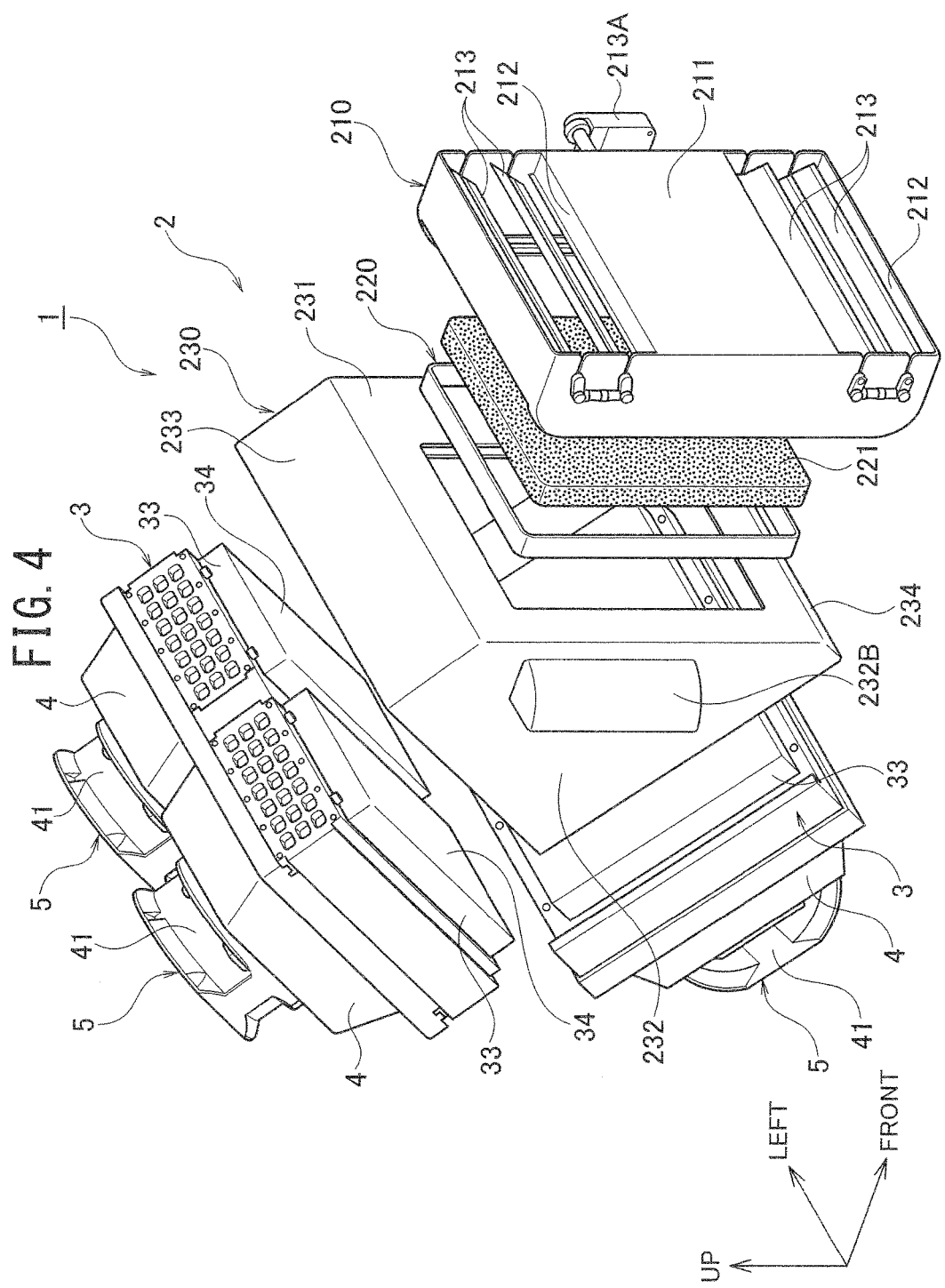
FIG. 4 is an exploded perspective view of the fuel cell apparatus for vehicles according to the embodiment of the present invention.
Figure 7:
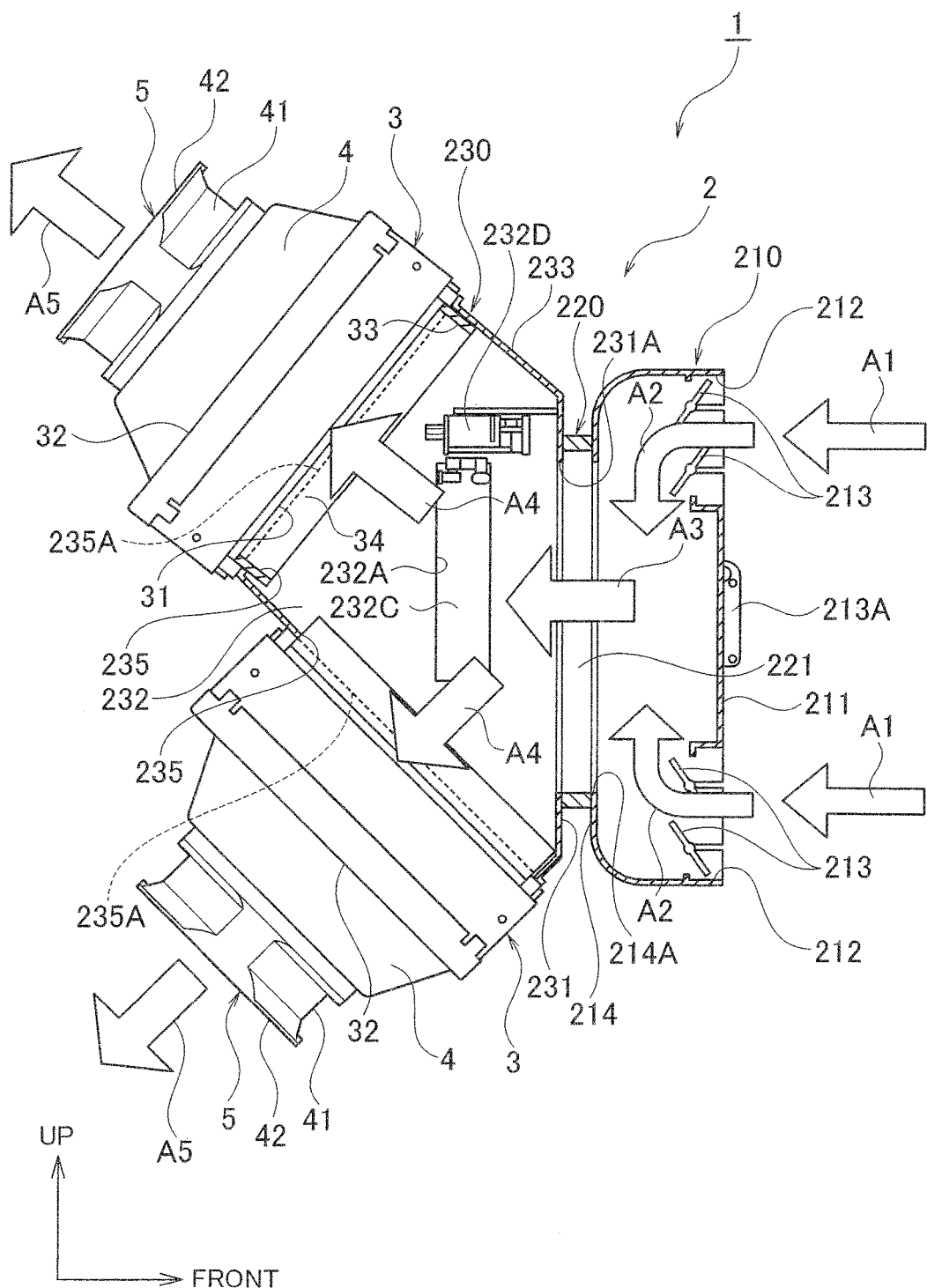
FIG. 7 is a sectional view showing a section along VII-VII of FIG. 6.

As shown in FIG. 7, the first duct portion 210 has a rear side panel 214 opposed to the front side panel 211 and formed with an opening 214A. This opening 214A is contoured to be slightly smaller than a contour of the rear side panel 214. In other words, the opening 214A has an area occupying the rear side panel 214, in a proportion set to be large. The second duct portion 220 is made as a tubular body rectangular in sections perpendicular to the axial direction. The second duct portion 220 has, at sections perpendicular to the axial direction, contours thereof set to be larger than the opening 214A formed in the rear side panel 214. The second duct portion 220 is connected to the rear side panel 214 of the first duct portion 210, to have air communication with the opening 214A formed in the rear side panel 214. Moreover, as shown in FIG. 4, the second duct portion 220 has a rectangular planar filter 221 accommodated therein. It is noted that the second duct portion 220 has an axial length thereof set to be nearly equal to the thickness of the filter 221, and relatively short.

As shown in FIG. 4, the third duct portion 230 is made in the form of an inside-hollow box outlined substantially in a trapezoidal prismatic shape. As shown in FIG. 7, the third duct portion 230 has a front side panel 231 disposed at the vehicle-longitudinally front side, and a pair of lateral side panels 232 disposed on both sides in the vehicle-transverse direction. It is noted that the third duct portion 230 has a pair of downstream openings 235 in a vehicle-longitudinally rear part thereof. It also is noted that those downstream openings 235 have their aperture areas 235A disposed to be substantially perpendicular to each other. At the third duct portion 230, one of the downstream openings 235 has a center axis thereof upwardly diagonally vehicle-longitudinally rearward oriented. At the third duct portion 230, the other of the downstream openings 235 has a center axis thereof downwardly diagonally vehicle-longitudinally rearward oriented. There is an upstream opening 231A formed in the front side panel 231. And, the front side panel 231 is connected to a downstream end of the second duct portion 220, to have air communication with the second duct portion 220.

Figure 5:
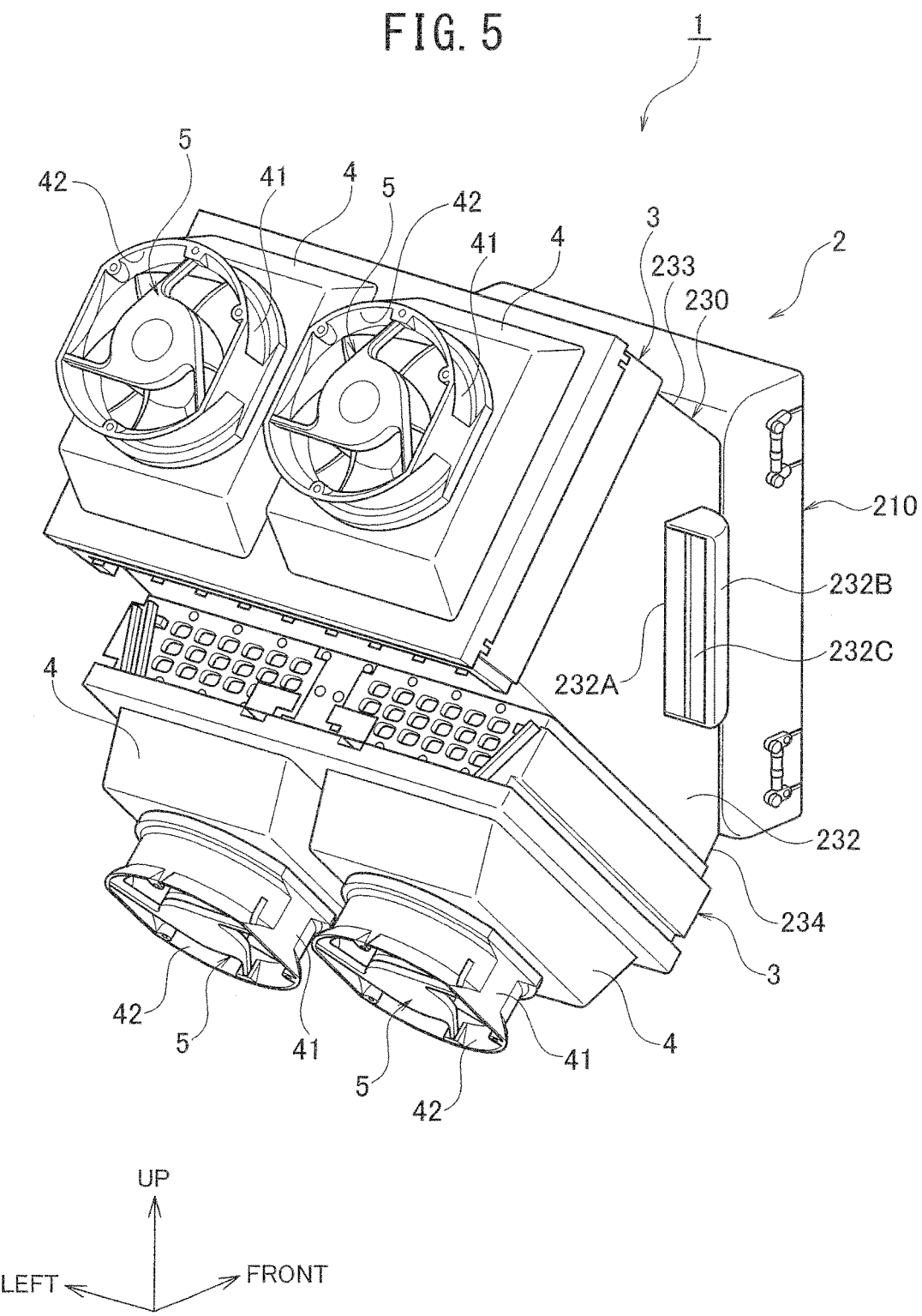
FIG. 5 is a perspective view showing the fuel cell apparatus for vehicles according to the embodiment of the present invention, as it is seen from diagonally behind.
Figure 6:
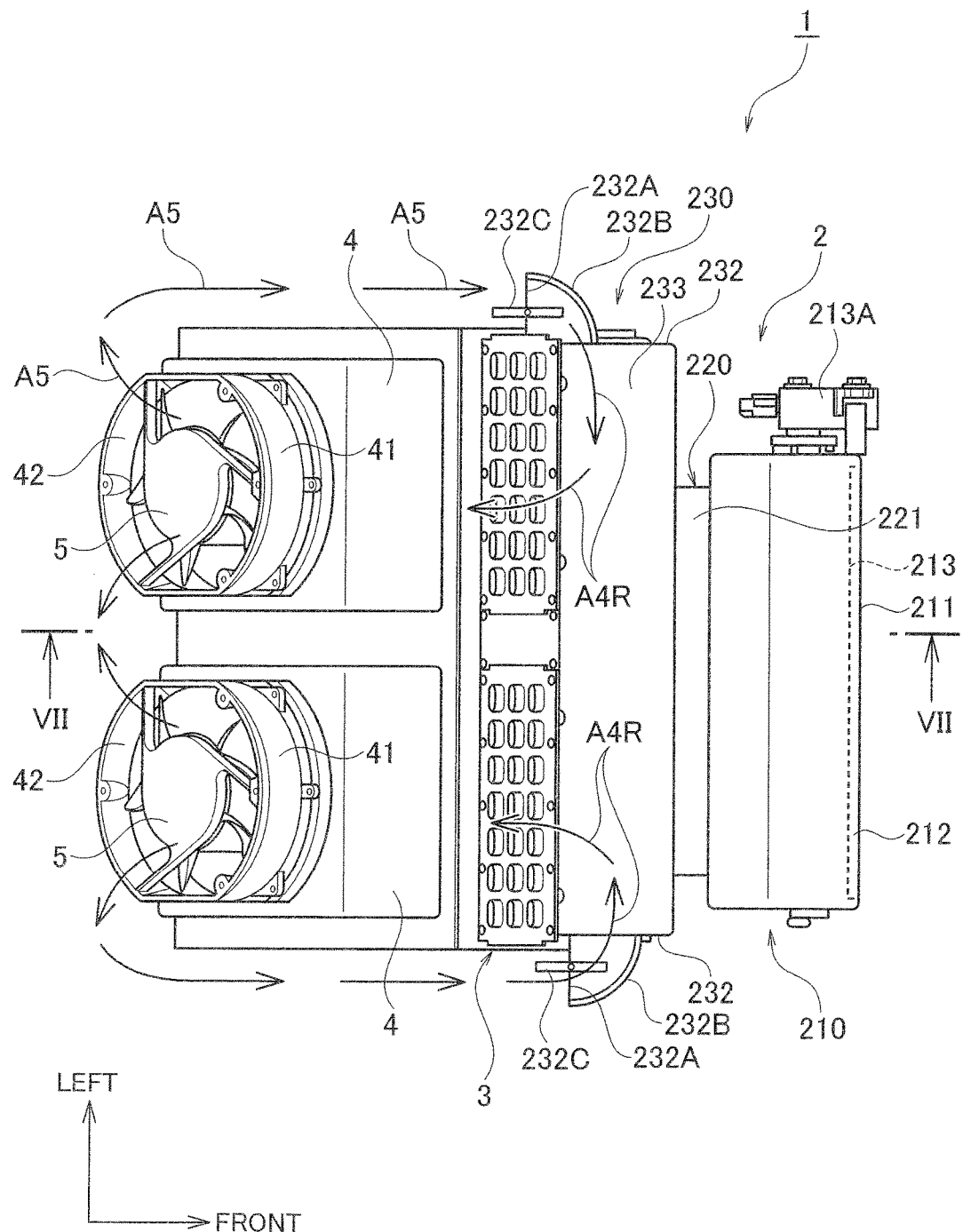
FIG. 6 is a plan view of the fuel cell apparatus for vehicles according to the embodiment of the present invention.

As shown in FIG. 5 and FIG. 6, the lateral side panels 232 have second air intake ports 232A formed therein. The second air intake ports 232A are formed along the vehicle-vertical direction. At the outsides of the second air intake ports 232A, there are provided hood parts 232B opening rearward to take in discharged air from vehicle-longitudinally rear sides. That is, the second air intake ports 232A are implemented by provision of the hood parts 232B to open substantially vehicle-longitudinally rearward. Moreover, the hood parts 232B have shutters 232C accommodated therein to open or close the second air intake ports 232A. As shown in FIG. 7, the shutters 232C are to be driven by shutter drivers 232D to serve for open-close operations. The shutter drivers 232D are provided on the interior sides of the lateral side panels 232. It is noted that the shutters 232C are set up to open when outside air has temperatures lower than a prescribed temperature (as a lower limit temperature of a range of temperatures affording for the fuel cell stacks 3 to operate as necessary).

(Fuel Cell Stacks)

The fuel cell stacks 3 have a configuration including unshown electrolyte films, hydrogen electrodes, air electrodes, and separators multi-layered to stack up. As shown in FIG. 7, the fuel cell stacks 3 each have an air intake aperture area 31 constituting one side of a rectangular parallelepiped structure, and an air discharging aperture area 32 constituting the other side in parallel with the air intake aperture area 31. At the fuel cell stacks 3, air is used as a reaction gas and a coolant. Moreover, as shown in FIG. 4 and FIG. 7, the fuel cell stacks 3 each have filter holders 33 formed in a short rectangular duct shape, and provided at the side of the air intake aperture area 31. The filter holders 33 have rectangular planar filters 34 accommodated therein. As shown in FIG. 7, each fuel cell stack 3 is connected, at the air intake aperture area 31 side, to a downstream opening 235 of the third duct portion 230, to have air communication therewith.

FIG. 8 is a block diagram of the fuel cell apparatus 1 for vehicles according to this embodiment. As shown in FIG. 8, there is arrangement including a hydrogen tank 6 having high-pressure compressed hydrogen gas stored therein, which is pressure-reduced at a pressure reducing valve 9, to introduce to unshown anode air-suction parts of the fuel cell stacks 3. On the other hand, outside air suctioned into the air suction duct 2 is driven forth by the air discharge fans 5, employing no high-pressure compressing compressor, to supply through the filters 221 and 34 to unshown cathode air-suction parts of the fuel cell stacks 3. At the fuel cell stacks 3, supplied air is not simply used for reactions to generate electricity, but also for services to cool the fuel cell stacks 3. There is an unshown anode air discharge line connected through a purge valve 8 to an unshown cathode air discharge line, and is adapted to serve, when surplus hydrogen gases are discharged at the anode side to discharge outside the vehicle, for use of air discharged at the cathode side to dilute hydrogen gases below a lower limit of inflammable concentration, to release into atmosphere. Further, as shown in FIG. 7, the fuel cell stacks 3 are adapted to take air inside through the air intake aperture areas 31, and discharge temperature-raised air outside through air discharging aperture areas 32.

(Air Discharge Ducts)

As shown in FIG. 3 through FIG. 6, at each fuel cell stack 3, paired air discharge ducts 4 fixed thereto are arranged to neighbor each other in the vehicle-transverse direction. As shown in FIG. 7, each air discharge duct 4 as a rectangular-prismatic tubular duct is connected to the air discharging aperture area 32 side of the fuel cell stack 3, to have air communication therewith. And, each air discharge duct 4 has an air discharge fan cover 41 of a circle-tubular shape fixed thereto at the downstream end. As shown in FIG. 5 and FIG. 6, the air discharge fan cover 41 has an air discharge fan 5 installed therein. It is noted that, in this embodiment, the air discharge fan cover 41 has an air discharge port 42 disposed in a vicinity of the air suction duct 2. In other words, the air discharge port 42 is located at short distances from a second air intake port 232A, for connection thereto.

(Operations and Effects of Fuel Cell Apparatus for Vehicles)

Description is now made of operations and effects of the fuel cell apparatus 1 for vehicles according to this embodiment. First, upon a startup of the fuel cell apparatus 1, hydrogen gas and air are introduced to the fuel cell apparatus 1. More specifically, as shown in FIG. 8, high-pressure compressed hydrogen gas stored in the hydrogen tank 6 is pressure-reduced by the pressure reducing valve 7, to introduce into unshown anode air suction parts of the fuel cell stacks 3 adapted therefor. On the other hand, outside air is suctioned into the air suction duct 2 through the filter 221, and supplied by use of the air discharge fans 5 to the unshown anode air suction parts of the fuel cell stacks 3, which have no high-pressure compression compressor. It is noted that, at the fuel cell stacks 3, such supplied air is not simply used for reactions to generate electricity, but also for services to cool the fuel cell stacks 3. Surplus hydrogen gases discharged at the anode side are diluted, by use of air discharged at the cathode side, below a lower limit of inflammable concentration to release into atmosphere, when discharging outside the vehicle. And, there is adaptation for discharge air discharged from the fuel cell stacks 3 to be conducted through the air discharge ducts 4, to release rearward in the engine room 104. Therefore, discharge air discharged from the air discharge ducts 4 is effective for the inside of the engine room 104t to e warmed.

(Situations Needing Warm-Up)

Under a prescribed low-temperature environment, the shutter driver 213A is operated to close the shutters 213 at the first air intake ports 212. Concurrently with the operation of the shutter driver 213A, the shutter drivers 232D are operated for operations of the shutters 232C to open the second air intake ports 232A. Here, the prescribed low-temperature environment refers to a situation in which the outside air temperature is lower than a lower limit temperature in an adequate range of temperatures for the fuel cell stacks 3 to operate as needed.

In this situation, the air discharge fans 5 are driven to rotate, and hence as shown in FIG. 6, air A5 (represented by arrows in FIG. 6) warmed along with startup of the fuel cell apparatus 1 comes around from the air discharge ports 42 to the second air intake ports 232A, where it is introduced into the air suction duct 2. Thus introduced warm air A4R (represented by arrows in FIG. 6) in the air suction duct 2 is taken in through the air intake aperture areas 31 of the fuel cell stacks 3, to insides of the fuel cell stacks 3, where it serves for reactions to generate electricity, and early warm-up of the fuel cell stacks 3.

(Situations Needing No Warm-Up)

On the other hand, the shutter drivers 232D are operable to close the shutters 232C provided at the second air intake ports 232A, in situations needing no warm-up of the fuel cell stacks 3, that is, when having got higher than the lower limit of the range of adequate temperatures for the fuel cell stacks 3 to operate as needed. Such being the case, the second air intake ports 232A located near the air discharge ports 42 of the air discharge ducts 4 can be closed, to thereby prevent warm air from the air discharge ports 42 from being introduced into the air suction duct 2. In this situation, the first air intake ports 212 are open. It is noted that the hood parts 232B provided at the second air intake ports 232A are vehicle-longitudinally rearward open, whereby air streams when running, vicinal to the air suction duct 2, have reduced tendencies to directly inflow.

As shown in FIG. 7, in situations in which only the first air intake ports 212 are open, air A1 (represented by arrows in FIG. 7) under suctioning effects by air discharge fans 5, or when running, is introduced through the first air intake ports 212 into the first duct portion 210. Air A2 (represented by arrows in FIG. 7) introduced into the first duct portion 210 is introduced through the filter 221 at the second duct portion 220 into the third duct portion 230. Air A4 introduced into the third duct portion 230 is divided at the paired downstream openings 235, into two to be introduced inside the fuel cell stacks 3. Warmed air having passed the fuel cell stacks 3 passes the air discharge ducts 4, constituting air A5 (represented by arrows in FIG. 7) to be discharged from the air discharge ports 42.

As described, according to an embodiment of the invention, there is a fuel cell apparatus 1 for vehicles including a fuel cell stack 3 disposed in a space (as an engine room 104) enclosed by vehicle body panels involving an engine hood 101, side panels 101, and a dash panel 103, and configured to take in air as a reaction gas and a coolant through an air intake aperture area 31 to the inside, and discharge temperature-raised air through an air discharging aperture area 32 to the outside, an air suction duct 2 connected to the air intake aperture area 31, an air discharge duct 4 connected to the air discharging aperture area 32, and an air discharge fan 5 configured to take in air to the air suction duct 4, characterized in that the air discharge duct 4 has an air discharge port 42 thereof disposed in a vicinity of the air suction duct 2, the air suction duct 2 is formed with a set of first air intake ports 212 opening at an upstream end portion of the air suction duct 2, and a set of second air intake ports 232A opening at a set of locations nearer to the air discharge port 42 of the air suction duct 4 than the first air intake port set 212, and a set of shutters 232C is provided at the second air intake port set 232A to open or close the second air intake port set 232A.

According to this embodiment, it is possible to implement a fuel cell apparatus 1 for vehicles adapted for a fuel cell stack 3 to have enhanced operability in situations involving low-temperature outside air, allowing for enhanced mountability to a vehicle 100. Such being the case, the fuel cell apparatus 1 for vehicles according to this embodiment makes use of discharge air of the fuel cell stack 3 for warm-up, thereby avoiding the need of separate provision such as that of a heat source such as a heater, or a heat source making use of a heat producing reaction of a catalyst reaction. Moreover, the fuel cell apparatus 1 for vehicles according to this embodiment does not need a dedicate coolant line to be used for war-up, either. Such being the case, the fuel cell apparatus 1 for vehicles according to this embodiment allows for suppressed power consumption to be minimized as necessary. Further, the fuel cell apparatus 1 for vehicles according to this embodiment can solve problems such as increases in numbers of component parts, or complexity of the system.

The fuel cell apparatus 1 for vehicles according to this embodiment configured as described is operable in situations involving low-temperature outside air, to open the shutter set 232C provided at the second air intake port set 232A, permitting air (as discharge air) heated at the fuel cell stack 3 and released outside from the air discharge port 42 to be introduced into the air suction duct 2, thereby allowing for the fuel cell stack 3 to have temperatures raised to be optimal for operation. Moreover, this embodiment can control a proportion between amounts of air introduced to the first air intake port set 212 and the second air intake port set 232A, thereby allowing for a temperature condition of the fuel cell stack 3 to be always kept adequate.

The fuel cell apparatus 1 for vehicles according to this embodiment has the air suction duct 2 provided with the second air intake port set 232A, thereby permitting high-temperature discharge air to be introduced at the location set near the air discharge port 42, allowing for the fuel cell stack 3 to have temperatures raised to be optimal for operation within a shorter interval of time.

The fuel cell apparatus 1 for vehicles according to this embodiment permits discharge air (as air) released inside the engine room 104 to be suctioned straightly from the air discharge duct 4 into the air suction duct 2, without extending the air discharge duct 4 up to a vicinity of the air suction duct 2. Therefore, this fuel cell apparatus 1 for vehicles can reduce fluid resistances when suctioning air through the second air intake port set 232A, while implementing a simplified configuration allowing for enhanced mountability to the vehicle 100.

In the fuel cell apparatus 1 for vehicles according to this embodiment, hood parts 232B provided at second air intake ports 232A are provided to face vehicle-longitudinally rearward. Therefore, the fuel cell apparatus 1 for vehicles can prevent air streams when running from flowing into the second air intake ports 232A. This allows for the fuel cell stack 3 to have temperatures raised to be optimal for operation within a shorter interval of time. Moreover, the second air intake ports 232A are provided in lateral side panels 232 at both vehicle-transverse sides of a third duct portion 230, thereby permitting the second air intake ports 232A at both sides of the third duct portion 230 to take in air released from the fuel cell stack 3 to the periphery. Therefore, warmed air can be efficiently introduced through the second air intake ports 232A at both sides, allowing for the fuel cell stack 3 to have temperatures raised to be optimal for operation within a shorter interval of time.

Further, the fuel cell apparatus 1 for vehicles according to this embodiment is operable in situations involving low-temperature outside air, to close a set of shutters 213 provided at the first air intake port set 212, thereby increasing amounts of air introduced through the second air intake port set 232A into the fuel cell stack 3, allowing for the fuel cell stack 3 to have temperatures raised earlier to be optimal for operation.

This embodiment is characterized in that the shutter set 232C is set up to open when outside air has temperatures lower than a lower limit temperature of a range of temperatures affording for the fuel cell stack 3 to operate as necessary. Therefore, according to this embodiment, it is possible to introduce warm air in the engine room 104 when outside air has temperatures lower than the lower limit temperature of the range of temperatures affording for the fuel cell stack 3 to operate as necessary, thus allowing for the fuel cell stack 3 to operate as needed.

This embodiment is characterized in that the fuel cell stack is mounted on the vehicle, with the air intake aperture area 31 in a vehicle-longitudinally frontward oriented position, and the second air intake port set 232A is substantially vehicle-longitudinally rearward open. Therefore, according to this embodiment, it is possible to prevent air streams when running from entering the second air intake port set 232A when the vehicle 100 is running, allowing for the fuel cell stack 3 to have temperatures raised to be optimal for operation within a shorter interval of time.

This embodiment is characterized in that the second air intake port set is arranged on both vehicle-transverse sides of the air suction duct. This embodiment permits the second air intake ports 232A disposed at both vehicle-transverse sides of the air suction duct 2 to take in air released from the fuel cell stack 3 to peripheral spaces, allowing for the fuel cell stack 3 to have temperatures raised to be optimal for operation within a shorter interval of time.

This embodiment is characterized in that the first air intake port set 212 is provided with the shutter set 213 to open or close the first air intake port set 212. According to this embodiment, it is possible in situations involving low-temperature outside air, to close the shutter set 213 provided at the first air intake port set 212, thereby increasing amounts of air suctioned through the second air intake port set 232A into the fuel cell stack 3, allowing for the fuel cell stack 3 to have temperatures raised earlier to be optimal for operation.

Other Embodiments

Embodiments have been described, including discussions and drawings constituting part of the disclosure, which should not be construed as restrictive to the invention. There may be various substitute embodiments, examples, and application techniques made apparent to artisan from the disclosure.

For instance, in the embodiment described, discharge air released from the air discharge port 42 is introduced to the second air intake port set 232A via a space in the engine room 104, while there may be employed a configuration including a transfer path such as a hose for conducting discharge air from the air discharge port 42 to a vicinal position. It is noted that, in the embodiment described, the second air intake ports 232A are formed in an elongate shape in the lateral side panels 232 at both sides, respectively, while the second air intake ports 232A may have their locations for installation, shapes, or piece numbers changed as necessary, as a matter of course.

Moreover, the embodiment described has the air discharge fans 5 disposed downstream of the fuel cell stacks 3, which may well be substituted with a configuration including air discharge fans 5 disposed upstream of fuel cell stacks 3. Still more, the embodiment described has the paired downstream openings 235 provided downstream of the air suction duct 2, while the number of downstream openings 235 is variable as necessary. Yet more, the embodiment described includes the air suction duct 2 and the air discharge ducts 4, of which structures also are not restrictive to this invention.

Further, the embodiment described includes the downstream openings 235 having their aperture areas 235 arranged to make right angles with each other, while they are not limited to right angles.

DESCRIPTION OF REFERENCE SIGNS 1 fuel cell apparatus for vehicles
2 air suction duct
3 fuel cell stack
4 air discharge duct
5 air discharge fan (fan)
31 air intake aperture area
32 air discharging aperture area
41 air discharge fan cover
42 air discharge port
100 vehicle
101 engine hood (vehicle panel)
102 side panel (vehicle panel)
103 dash panel (vehicle panel)
104 engine room (space)
210 first duct portion (air suction duct)
220 second duct portion (air suction duct)
230 third duct portion (air suction duct)
212 first air intake port
213 shutter
213A shutter driver
232 lateral side panel
232A second air intake port
232B hood part
232C shutter
232D shutter driver

The invention claimed is:

1. A vehicle fuel cell apparatus including a fuel cell stack disposed in a space enclosed by vehicle body panels, and configured to take in air as a reaction gas and a coolant through an air intake aperture area to an inside thereof, and discharge heated air through an air discharging aperture area to an outside thereof, an air suction duct connected to the air intake aperture area, wherein the air suction duct includes lateral side panels, an air discharge duct connected to the air discharging aperture area, and a fan configured to take in ambient cooling air to an inside of the air suction duct, the vehicle fuel cell apparatus comprising:
the air discharge duct having an air discharge port disposed in a vicinity of the air suction duct and configured to discharge at least a portion of the heated air into the space enclosed by the vehicle body panels;
the air suction duct being formed with a first air intake port set opening at an upstream end portion of the air suction duct, and a second air intake port set formed in at least one of the lateral side panels and opening at a location set nearer to the air discharge port than the first air intake port set, the first air intake port set being configured and arranged to admit the ambient cooling air to the inside of the air suction duct, the second air intake port set being configured and arranged to admit the heated air to the inside of the air suction duct; and
a shutter set provided at the second air intake port set to open or close the second air intake port set.

2. The vehicle fuel cell apparatus according to claim 1, wherein the shutter set is set up to open when outside air has temperatures lower than a lower limit temperature of a range of temperatures affording for the fuel cell stack to operate as necessary.

3. The vehicle fuel cell apparatus according to claim 1, wherein the fuel cell stack is mounted on a vehicle, with the air intake aperture area in a vehicle-longitudinally frontward oriented position, and
the second air intake port set is substantially vehicle-longitudinally rearward open.

4. The vehicle fuel cell apparatus according to claim 1, wherein the second air intake port set is arranged on both vehicle-transverse sides of the air suction duct.

5. The vehicle fuel cell apparatus according to claim 1, wherein the first air intake port set is provided with a shutter set to open or close the first air intake port set.

6. An intake arrangement for warming up a fuel cell stack mounted on a vehicle having vehicle body panels enclosing a space, comprising:
a fuel cell stack disposed in the space and having an air intake aperture area and an air-discharging aperture area;
an air suction duct disposed in the space and connected to the air intake aperture area of the fuel cell stack for admitting air into the fuel cell stack through the air intake aperture area, the air suction duct having an upstream end portion and a downstream end portion connected to the air intake aperture area of the fuel cell stack, and lateral side panels between the upstream and downstream end portions; and
an air discharge duct disposed in the space and connected to the air-discharging aperture area of the fuel cell stack for discharging heated air from the fuel cell stack through the air-discharging aperture area,
the air discharge duct having at least one air discharge port oriented to direct at least a portion of the heated air discharged into the space,
the upstream end portion of the air suction duct including first intake ports oriented to admit ambient cooling air inside the air suction duct,
the lateral side panels including second intake ports opening to the space and oriented to admit the portion of the heated air that is directed by the air discharge port into the space inside the air suction duct,
the air suction duct having shutters provided at the second intake ports to open or close the second intake ports.

7. The intake arrangement as claimed in claim 6, wherein the air suction duct includes shutters provided at the first intake ports to open or close the first intake ports.

8. The intake arrangement as claimed in claim 7, wherein the air suction duct includes a first duct portion, a second duct portion and a third duct portion, the first duct portion including the upstream end portion, the second duct portion including the lateral side panels, the third duct portion including the downstream end portion.

9. The intake arrangement as claimed in claim 7, wherein the portion of the heated air that is directed by the air discharge port into the space passes through the space to the second intake ports.

* * * * *